US011379265B2

(12) United States Patent
Yu et al.

(10) Patent No.: US 11,379,265 B2
(45) Date of Patent: Jul. 5, 2022

(54) RESOURCE MANAGEMENT METHOD, HOST, AND ENDPOINT BASED ON PERFORMANCE SPECIFICATION

(71) Applicant: HUAWEI TECHNOLOGIES CO., LTD., Guangdong (CN)

(72) Inventors: Baifeng Yu, Hangzhou (CN); Jiongjiong Gu, Shenzhen (CN); Muhui Lin, Shenzhen (CN); Zhou Yu, Hangzhou (CN); Lingzhi Mao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 169 days.

(21) Appl. No.: 16/434,403

(22) Filed: Jun. 7, 2019

(65) Prior Publication Data

US 2019/0286488 A1  Sep. 19, 2019

Related U.S. Application Data

(63) Continuation of application No. 15/471,202, filed on Mar. 28, 2017, now Pat. No. 10,489,207, which is a
(Continued)

(30) Foreign Application Priority Data

Dec. 8, 2014 (CN) .......................... 201410745161.3

(51) Int. Cl.
*G06F 9/50* (2006.01)
*G06F 11/34* (2006.01)
(Continued)

(52) U.S. Cl.
CPC .............. *G06F 9/5027* (2013.01); *G06F 9/50* (2013.01); *G06F 9/5044* (2013.01);
(Continued)

(58) Field of Classification Search
None
See application file for complete search history.

(56) References Cited

U.S. PATENT DOCUMENTS 6,816,456 B1 * 11/2004 Tse-Au ............... H04L 41/5054
370/230.1
7,159,010 B2   1/2007 Harbin et al.
(Continued)

FOREIGN PATENT DOCUMENTS

CN    101938416 A    1/2011
CN    102087618 A    6/2011
(Continued)

OTHER PUBLICATIONS

Versteeg et al, "Emulation of Cloud-Scale Environments for Scalability Testing," 2012 12th International Conference on Quality Software, 2012, pp. 201-209, doi: 10.1109/QSIC.2012.57 (Year: 2012).*
(Continued)

*Primary Examiner* — Abu Zar Ghaffari
(74) *Attorney, Agent, or Firm* — Leydig, Voit & Mayer, Ltd.

(57) ABSTRACT

A resource management technology is disclosed that may be applied to a host, where the host includes a Central Processing Unit (CPU), an endpoint connected to the CPU, and an Input/Output (I/O) device connected to the endpoint. A method includes: allocating, by the CPU, a target endpoint to a target process, where a virtual device is disposed on the target endpoint; obtaining, by the target endpoint, a performance specification of the target process, and adjusting a performance parameter of the virtual device according to the performance specification, where the adjusted virtual device satisfies requirements of performance specifications of all processes that use the target endpoint; and when the target process needs to access a resource, obtaining, from the I/O
(Continued)

device, a resource that satisfies the performance specification of the target process, and providing the obtained resource to the target process for use.

10 Claims, 5 Drawing Sheets

Related U.S. Application Data continuation of application No. PCT/CN2015/093800, filed on Nov. 4, 2015.

(51) Int. Cl.
*G06F 11/30* (2006.01)
*G06F 9/455* (2018.01)

(52) U.S. Cl.
CPC ........ *G06F 9/5077* (2013.01); *G06F 11/3017* (2013.01); *G06F 11/3442* (2013.01); *G06F 11/3452* (2013.01); *G06F 2009/45579* (2013.01)

(56) References Cited

U.S. PATENT DOCUMENTS

| | | |
|---|---|---|
| 7,623,516 B2 | 11/2009 | Chaturvedi et al. |
| 7,685,281 B1 | 3/2010 | Saraiya et al. |
| 7,711,789 B1 | 5/2010 | Jnagal et al. |
| 7,818,447 B1 | 10/2010 | Niver et al. |
| 7,970,903 B2 | 6/2011 | Oeda |
| 8,139,598 B2 | 3/2012 | Holmstroem et al. |
| 8,276,140 B1 | 9/2012 | Beda, III et al. |
| 8,549,516 B2 | 10/2013 | Warfield |
| 8,631,154 B2 | 1/2014 | Bartfai-Walcott et al. |
| 8,707,316 B1 | 4/2014 | Wang et al. |
| 8,966,321 B2 | 2/2015 | Kristiansen et al. |
| 9,154,589 B1 * | 10/2015 | Klein ................ H04L 41/0896 |
| 9,444,800 B1 | 9/2016 | Roth et al. |
| 9,495,211 B1 | 11/2016 | Helstroom et al. |
| 9,608,933 B2 | 3/2017 | Emaru et al. |
| 9,635,103 B2 | 4/2017 | Earl et al. |
| 9,804,877 B2 * | 10/2017 | Hunter ................ G06F 13/4221 |
| 9,842,075 B1 * | 12/2017 | Davis ................ G06F 13/4295 |
| 2003/0208581 A1 | 11/2003 | Behren et al. |
| 2005/0108582 A1 * | 5/2005 | Fung .................... G06F 1/3221 713/300 |
| 2006/0242332 A1 | 10/2006 | Johnsen et al. |
| 2007/0041330 A1 | 2/2007 | Bostica et al. |
| 2007/0198656 A1 * | 8/2007 | Mazzaferri ........... H04L 67/141 709/218 |
| 2008/0104276 A1 | 5/2008 | Lahoti et al. |
| 2008/0288661 A1 * | 11/2008 | Galles .................... G06F 13/10 710/3 |
| 2009/0006702 A1 * | 1/2009 | Sarangdhar ............ G06F 13/14 710/305 |
| 2009/0144731 A1 | 6/2009 | Brown et al. |
| 2009/0150529 A1 * | 6/2009 | Tripathi ................. G06F 9/455 709/222 |
| 2010/0138829 A1 | 6/2010 | Hanquez et al. |
| 2010/0165874 A1 | 7/2010 | Brown et al. |
| 2010/0306416 A1 | 12/2010 | Watkins |
| 2011/0010427 A1 | 1/2011 | Jnagal et al. |
| 2011/0055433 A1 | 3/2011 | Kishore et al. |
| 2011/0119423 A1 | 5/2011 | Kishore et al. |
| 2011/0179414 A1 | 7/2011 | Goggin et al. |
| 2011/0264805 A1 | 10/2011 | Breitgand et al. |
| 2012/0284712 A1 | 11/2012 | Nimmagadda et al. |
| 2013/0024680 A1 | 1/2013 | Heidingsfeld et al. |
| 2013/0036417 A1 | 2/2013 | Chen et al. |
| 2013/0138813 A1 | 5/2013 | Patel et al. |
| 2013/0262638 A1 | 10/2013 | Kumarasamy et al. |
| 2013/0297907 A1 | 11/2013 | Ki et al. |
| 2013/0304903 A1 * | 11/2013 | Mick ....................... H04L 67/16 709/224 |
| 2013/0332686 A1 | 12/2013 | Ishizawa et al. |
| 2014/0007097 A1 | 1/2014 | Chin et al. |
| 2014/0013132 A1 | 1/2014 | De Rochemont et al. |
| 2014/0160931 A1 * | 6/2014 | Choi ....................... H04L 47/24 370/235 |
| 2014/0324862 A1 * | 10/2014 | Bingham ................ G06F 16/26 707/737 |
| 2014/0325522 A1 | 10/2014 | Li et al. |
| 2014/0337839 A1 | 11/2014 | Hyde et al. |
| 2015/0052526 A1 | 2/2015 | Fujiwaka et al. |
| 2015/0261706 A1 * | 9/2015 | Kuch .................. G06F 9/45545 710/104 |
| 2015/0263992 A1 | 9/2015 | Kuch et al. |
| 2015/0370611 A1 * | 12/2015 | Amann ................. G06F 13/426 709/216 |
| 2017/0005908 A1 | 1/2017 | Johnsen et al. |

FOREIGN PATENT DOCUMENTS

| | | |
|---|---|---|
| CN | 102257479 A | 11/2011 |
| CN | 102662750 A | 9/2012 |
| CN | 103353861 A | 10/2013 |
| CN | 103473037 A | 12/2013 |
| CN | 103503404 A | 1/2014 |
| CN | 103870341 A | 6/2014 |
| CN | 104111800 A | 10/2014 |
| JP | 2015518602 A | 7/2015 |
| KR | 20100080360 A | 7/2010 |
| KR | 20140096084 A | 8/2014 |
| RU | 2417417 C2 | 5/2008 |
| WO | 2013082742 A1 | 6/2013 |
| WO | 2013148600 A1 | 10/2013 |
| WO | 2014058411 A1 | 4/2014 |

OTHER PUBLICATIONS

Mohammad Al-Fares et al, Hedera: Dynamic Flow Scheduling for Data Center Networks. NSDI''10 Proceedings of the 7th USENIX conference on Networked systems design and implementation, San Jose, California—Apr. 28-30, 2010, 15 pages.

Theophilus Benson et al, Network Traffic Characteristics of Data Centers in the Wild IMC'10, Nov. 1-3, 2010, Melbourne, Australia, 14 pages.

Theophilus Benson et al, Understanding Data Center Traffic Characteristics. WREN'09, Aug. 21, 2009, Barcelona, Spain, 8 pages.

Albert Greenberg et al, VL2: A Scalable and Flexible Data Center Network. SIGCOMM'09, Aug. 17-21, 2009, Barcelona, Spain. 12 pages.

Cisco UCS Manager GUI Configuration Guide, Release 2.2, Chapter: Configuring Quality of Service. Retrieved from cisco.com/c/en/us/td/docs/unified_computing/ucs/sw/gui/config/guide/2-2/b_UCSM_GUI_Configuration_Guide_2_2/configuring_quality_of_service.html, Updated: Apr. 16, 2018, 8 pages.

Christopher R Lumb et al : "Façade: virtual storage devices with performance guarantees", Appears in the proceedings of the 2nd USENIX conference on file and storage technologies, Apr. 2, 2003, XP055418001, 14 pages.

\* cited by examiner

RESOURCE MANAGEMENT METHOD, HOST, AND ENDPOINT BASED ON PERFORMANCE SPECIFICATION

CROSS-REFERENCE TO RELATED APPLICATION

This application is a continuation of U.S. patent application Ser. No. 15/471,202, filed on Mar. 28, 2017, which is a continuation of International Application No. PCT/CN2015/093800, filed on Nov. 4, 2015. The International Application claims priority to Chinese Patent Application No. 201410745161.3, filed on Dec. 8, 2014. All of the aforementioned patent applications are hereby incorporated by reference in their entireties.

TECHNICAL FIELD

The present disclosure relates to the computer field, and in particular, to a resource management technology.

BACKGROUND

A data center is a set of complex facilities, including a computer system and other auxiliary devices. The data center can provide functions such as storage, calculation, and networking.

When processing data in a virtual local area network (Virtual LAN, VLAN), the data center may perform priority control at different levels on traffic in the VLAN, and may also perform priority control on data in different protocols in a same VLAN, so as to preferentially allocate a resource (e.g., bandwidth, latency, time) to data with a high priority for use. For example, a priority of data in the Internet Small Computer Systems Interface (iSCSI) protocol is set to be higher than that of data in the Fibre Channel (Fibre Channel, FC) protocol.

An executing software process is a data running operation unit. In the data center, different processes may correspond to different services (e.g., provide a 100 megabyte bandwidth service level, provide a 50 megabyte service level, etc.). However, in the prior art, it is difficult to ensure the quality of service of each process. A case may occur in which some processes do not obtain sufficient resources, or a case may occur in which resources used by the processes do not reach requirements.

SUMMARY

A first possible embodiment provides a resource management method applied to a host, where the host includes a Central Processing Unit (CPU) in which a process is configured and an endpoint in communication with the CPU, the endpoint in communication with an Input/Output (I/O) device, and the method includes: allocating, by the CPU, a target endpoint to a target process, where a virtual device is disposed on the target endpoint; obtaining, by the target endpoint, a performance specification of the target process, and adjusting a performance parameter of the virtual device according to the performance specification, where the adjusted virtual device satisfies a total requirement of performance specifications of all processes that use the target endpoint; when the target process needs to access a resource, sending, by the CPU, a resource access request of the target process, for the virtual device to the target endpoint; and after receiving the resource access request, obtaining, by the target endpoint from the I/O device, a resource that satisfies the performance specification of the target process, and providing the obtained resource to the target process for use. By using this solution, it may be ensured that resource performance of the target process and another process allocated to the endpoint reaches a preset standard, which achieves a QoS effect.

In a first aspect of the first possible embodiment, a specific manner of the obtaining, by the target endpoint, a performance specification of the target process may be: obtaining, by the target endpoint, the performance specification from the CPU; or may be: collecting, by the target endpoint, statistics about performance of a resource occupied when the target process runs in history, and generating the performance specification according to a statistical result. The former manner is faster, and the latter manner can better satisfy an actual requirement of the process.

In a second aspect of the first possible embodiment, the target process is a process that runs in a virtual machine, a multi-threaded process that runs in a physical machine, or a virtual machine. The three all comply with a concept of "process".

In a third aspect of the first possible embodiment, the first possible embodiment an I/O resource may be from a single I/O device, or from an I/O resource pool. If the I/O resource is from the I/O resource pool, resources of multiple I/O devices from multiple endpoints may form the I/O resource pool together, or resources of multiple I/O devices from a same endpoint form the I/O resource pool together. By means of resource pooling, the I/O resource may be better scheduled between endpoints or in an endpoint, and a utilization rate of the I/O device may be higher.

In a fourth aspect of the first possible embodiment, that the adjusted virtual device satisfies a total requirement of performance specifications of all processes that use the target endpoint includes: for performance that can be shared by multiple processes, satisfying a maximum requirement for this performance parameter in all performance specifications; and for performance that cannot be shared by the multiple processes, satisfying a total requirement for performance parameters in all performance specifications. In this way, resource performance required by the target process may be guaranteed.

In a fifth aspect of the first possible embodiment, a method for migrating the process from a host to a second host is provided, where the second host includes second CPU, second endpoint, and a second I/O resource pool, and the migrating include: sending, by the CPU, the performance specification of the process to the second CPU; sending, by the second CPU, the performance specification to the second endpoint; generating, by the second endpoint, second virtual device, where the second virtual device satisfies the performance specification; sending, by the CPU, description information of the process to the second CPU, and generating, by the second CPU, a new process according to the description information; and sending, by the second CPU, second resource access request of the new process for the second virtual device to the second endpoint when the new process needs to access a resource; and after receiving the second resource access request, obtaining, by the second endpoint, a resource from the second I/O resource pool according to the performance specification, and providing the resource to the target process for use. A new endpoint can also provide, for a new process (a process obtained after migration) by using this migration solution, a resource that satisfies a performance requirement.

A second possible embodiment provides a host, including a Central Processing Unit (CPU); an endpoint in communication with the CPU and an Input/Output (I/O) resource; a target endpoint in communication with the CPU and an I/O device; and: a memory storage comprising instructions in communication with the CPU, wherein the CPU executes the instructions to: allocate the target endpoint to a process send a resource access request, of a target process, for the virtual device to the target endpoint when the target process needs to access a resource; and wherein the target endpoint performs operations to receive the resource access request; generate the virtual device; obtain a performance specification of the target process, adjust a performance parameter of the virtual device according to the performance specification, where the adjusted virtual device satisfies a total requirement of performance specifications of all processes that use the target endpoint; and obtain, after receiving the resource access request, an I/O resource from the I/O device according to the performance specification of the target process, and provide the resource to the target process for use. The host in the second possible embodiment may use the implementation methods of the first possible embodiment and each aspect of the first possible embodiment, which has a corresponding beneficial effect.

A third possible embodiment provides a resource management method that is applied to an endpoint, where the endpoint in communication with a Central Processing Unit (CPU) by using a CPU interface, the endpoint in communication with an I/O device by using an input/output (I/O) interface, and a virtual device is disposed on the endpoint; and the method includes: obtaining a performance specification of a target process, and adjusting a performance parameter of the virtual device according to the performance specification, where the adjusted virtual device satisfies a total requirement of performance specifications of all processes that use the endpoint; and receiving a resource access request, of the target process, for the virtual device by using the CPU interface, obtaining, from the I/O device, a resource that satisfies the performance specification of the target process, and providing the obtained resource to the target process by using the CPU interface. The endpoint in the third possible embodiment is consistent with the endpoint in the first possible embodiment and in the solution in each aspect of the first possible embodiment, and therefore may execute the foregoing operation steps, which has a corresponding beneficial effect.

A fourth possible embodiment provides a resource management method that is applied to an endpoint, where the endpoint in communicated with a Central Processing Unit (CPU) by using a CPU interface, the endpoint in communication with an I/O device by using an input/output (I/O) interface, and a virtual device is disposed on the endpoint; and the method includes: obtaining a performance specification of a target process, and adjusting a performance parameter of the virtual device according to the performance specification, where the adjusted virtual device satisfies a total requirement of performance specifications of all processes that use the endpoint; and receiving a resource access request, of the target process, for the virtual device by using the CPU interface, obtaining, from the I/O device, a resource that satisfies the performance specification of the target process, and providing the obtained resource to the target process by using the CPU interface. The endpoint in the fourth possible embodiment is consistent with the endpoint in the first possible embodiment and in the solution in each aspect of the first possible embodiment, and therefore may execute the foregoing operation steps, which has a corresponding beneficial effect.

A fifth possible embodiment provides a resource management apparatus in which a virtual device is disposed, where the resource management apparatus may be hardware or may be software, and is a structural description of an endpoint or software in an endpoint. The resource management apparatus includes: a receiving module, configured to receive a performance specification of a target process and a resource access request; a virtual device adjustment module, configured to adjust a performance parameter of the virtual device according to the performance specification, where the adjusted virtual device satisfies a total requirement of performance specifications of all processes that use the resource management device; and a resource acquiring module, configured to: after the receiving module receives the resource access request, of the target process, for the virtual device, obtain, from an I/O device, a resource that satisfies the performance specification of the target process, and provide the resource to the target process. The endpoint in the fifth possible embodiment has a function of the endpoint in the first possible embodiment and in the solution in each aspect of the first possible embodiment, which has a corresponding beneficial effect.

In a sixth possible embodiment, an internal structural endpoint of an endpoint is described, where the endpoint communication with a Central Processing Unit (CPU), and the endpoint includes: a CPU interface, in communication with the CPU; an input/output I/O interface, in communication with an I/O device; and a processing unit in which a virtual device is disposed, where the processing unit in communication with the CPU interface and the I/O interface, and is further configured to: obtain a performance specification of a target process, and adjust a performance parameter of the virtual device according to the performance specification, where the adjusted virtual device satisfies a total requirement of performance specifications of all processes that use the endpoint; and receive a resource access request, of the target process, for the virtual device by using the CPU interface, obtain, from the I/O device, a resource that satisfies the performance specification of the target process, and provide the obtained resource to the target process by using the CPU interface. The endpoint in the sixth possible embodiment is consistent with the endpoint in the first possible embodiment and in the solution in each aspect of the first possible embodiment, and therefore may execute the foregoing operation steps, which has a corresponding beneficial effect.

BRIEF DESCRIPTION OF DRAWINGS

To describe the solutions in the embodiments more clearly, the following briefly describes the accompanying drawings required for describing the embodiments. The accompanying drawings in the following description show merely some embodiments, and other drawings mat still be derived from these accompanying drawings.

DESCRIPTION OF EMBODIMENTS

The following clearly and completely describes the technical solutions in the present disclosure with reference to the accompanying drawings in embodiments. The described embodiments are merely some but not all of the embodiments. All other embodiments obtained based on the embodiments shall fall within the protection scope.

PCIe is a system bus standard widely used in a data center, and a large quantity of data center computer peripherals belong to a PCIe endpoint (Endpoint) scope.

Figure 1:
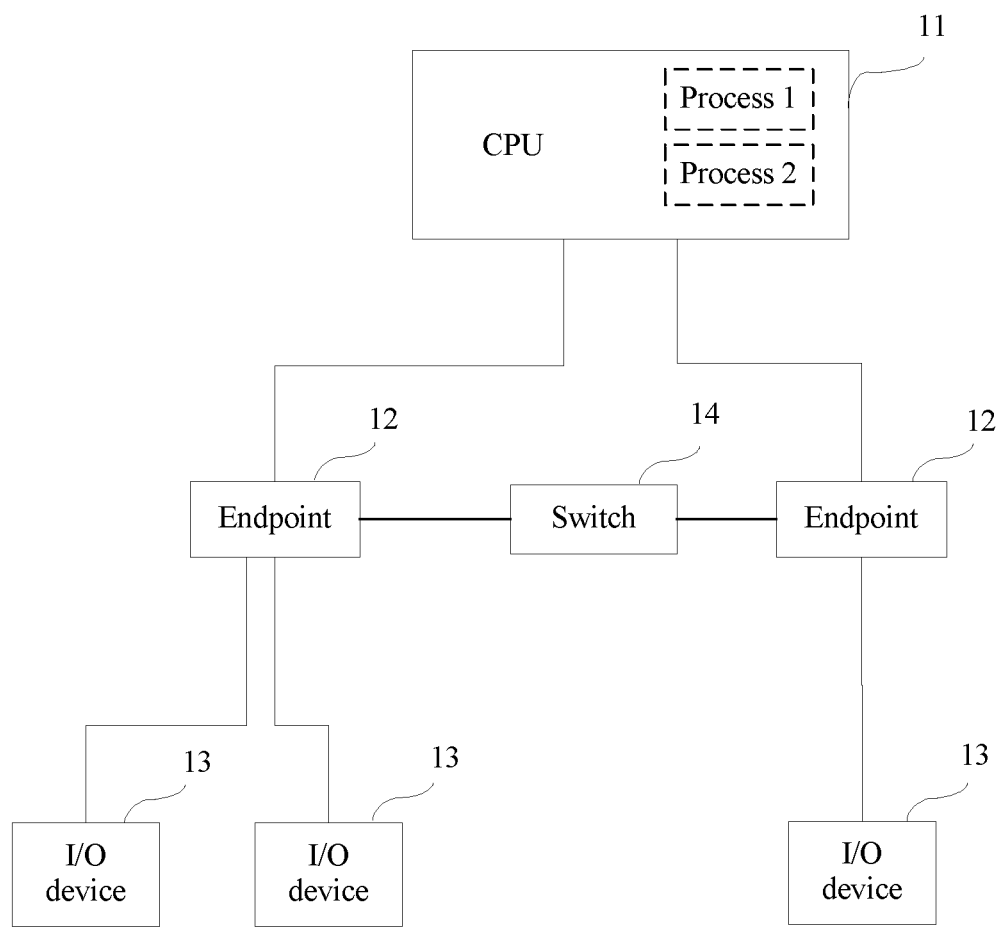
FIG. 1 is an internal topology diagram of a computer according to an embodiment.

A method in an embodiment may be used in a Peripheral Component Interconnect Express (PCI Express, PCIe) endpoint (Endpoint). The PCIe endpoint may be, for example, a network adapter (Network Adapter) or a host bus adapter (Host Bus Adapter, HBA) card. Referring to FIG. 1, FIG. 1 is an internal structural diagram of a computer. An endpoint 12 is an initiator or a completer of a PCIe transaction. A CPU 11 is connected to the endpoint 12. The endpoint 12 is connected to an I/O device 13, and provides an I/O resource of the I/O device to a CPU for use. The I/O device is, for example, a memory, an accelerator card, or a network adapter, where the memory can provide a storage resource, the accelerator card can provide a computing resource, and the network adapter can provide a bandwidth resource. When a host includes multiple CPUs, the CPU 11 is a set of all the CPUs on a same host. It should be noted that the I/O device 13 may be located inside the computer, or may be a peripheral device of the computer. The following describes a case in which the I/O device is located inside the computer.

The PCIe endpoint may also be referred to as an endpoint. The endpoint is a PCIe function device that serves as a requester or a completer of a PCIe transaction on behalf of itself or a non-PCIe device. For example, the endpoint is a graphic controller mounted on a PCIe bus or a PCIe USB host controller. The endpoint falls into the following types: a Legacy endpoint, a PCI Express endpoint, and a root complex integrated endpoint.

The endpoint 12 includes a processor, and therefore has a computation capability. The endpoint further includes interfaces and is separately connected to the I/O device and the CPU. The endpoint can manage, in a resource pool manner, the I/O device 13 that is connected to the endpoint, and provide a resource in a resource pool (e.g., a logical collection of endpoints) to the CPU 11 for use. The endpoint 12 may run a virtual device, where the virtual device is configured to execute a service that runs on the CPU 11. When there are multiple endpoints 12, the endpoints 12 may be interconnected, may be directly connected in a wired or wireless manner, or may be connected by using a switch.

The multiple endpoints 12 may communicate with each other by using a switch 14, so as to manage all I/O devices 13 together. For example, a resource provided by the I/O device 13 of each endpoint 12 may be shared by the endpoints 12. When the I/O device 13 that directly belongs to an endpoint cannot provide sufficient resources for the virtual device (vDev), resources may be obtained from the I/O device 13 that directly belongs to another endpoint 12.

Optionally, when there are multiple endpoints 12, a switch (not shown in the figure) may be added between the CPU 11 and the endpoints 12. The switch performs data exchange between the CPU 11 and the endpoints 12. On one hand, an external port of the endpoints 12 may be extended, that is, the CPU 11 may be connected to more endpoints 12; on the other hand, data of the CPU 11 may be sent to a correct endpoint 12 more accurately and quickly.

Figure 2:
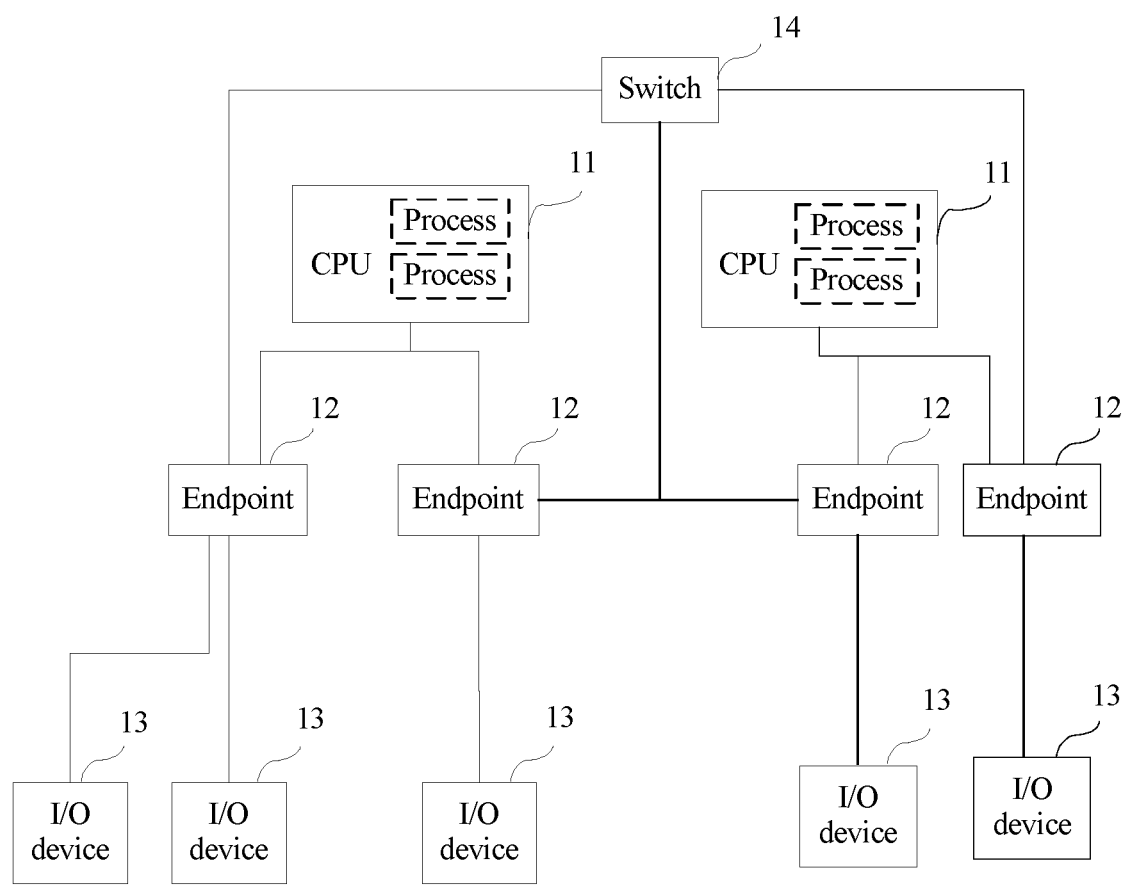
FIG. 2 is a topology diagram of a case in which two computers are interconnected according to an embodiment.

FIG. 2 is another topology diagram, and a difference from FIG. 1 is that two computers are included. Endpoints of the computers are interconnected by using a switch 14, so that endpoints 12 may manage all I/O devices 13 together by means of negotiation. A system constituted by three or more computers is also applicable to the present disclosure, provided that endpoints of these computers are connected by using a switch. The computer is also referred to as a host or a node, and different computers operate their respective operating systems. If a process runs in a virtual machine, the virtual machine runs in a hypervisor (hypervisor), and different hosts have their own hypervisors.

The following describes an embodiment by using an example in which a memory is used as an I/O device. A memory, for example, a medium such as a magnetic disk or a solid state disk, may be an independent storage medium, or may be an array constituted by multiple storage media. A storage device can provide service capabilities including multiple parameters, such as a throughput, a latency time, bandwidth, a packet loss rate, and jitter. Quality of service (QoS) required by different processes (Process) is generally different. For example, high bandwidth is generally required to satisfy a process of a high-definition video, and a shorter latency time and a lower packet loss rate are generally expected in a process of a banking service.

A service level agreement (Service Level Agreement, SLA) is an agreement or a contract that is determined by means of negotiation between a service provider and a user on a quality of a service level, and the agreement or the contract specifies agreements on service content, a priority, responsibilities, and the like, that are reached by the service provider and the user. The SLA mainly includes two parts: (1) a commercial part, for example, two contracting parties, rights and responsibilities, and a charging rule; (2) a technical part, for example, a source node address, a destination node address, and reserved bandwidth, a latency time, jitter, and packet loss that are required for satisfying quality of service; and some other technical parameters related to a network. It should be noted that in this embodiment, only a part related to quality of service in an SLA service object is discussed. Specifically, only a performance specification described in the technical part of the SLA is discussed, where the performance specification may be quantized, for example, a bandwidth value, a latency time value, a jitter value, or a packet loss rate value may be a performance specification. The remaining part (for example, the commercial part and a source address or a destination address) of the SLA is not discussed in this embodiment. For example, if a latency time performance specification of a process 1 is required to be less than or equal to 0.5 ms, an SLA generated for this service is as follows: "Process 1: The latency time is less than or equal to 0.5 ms".

Figure 3:
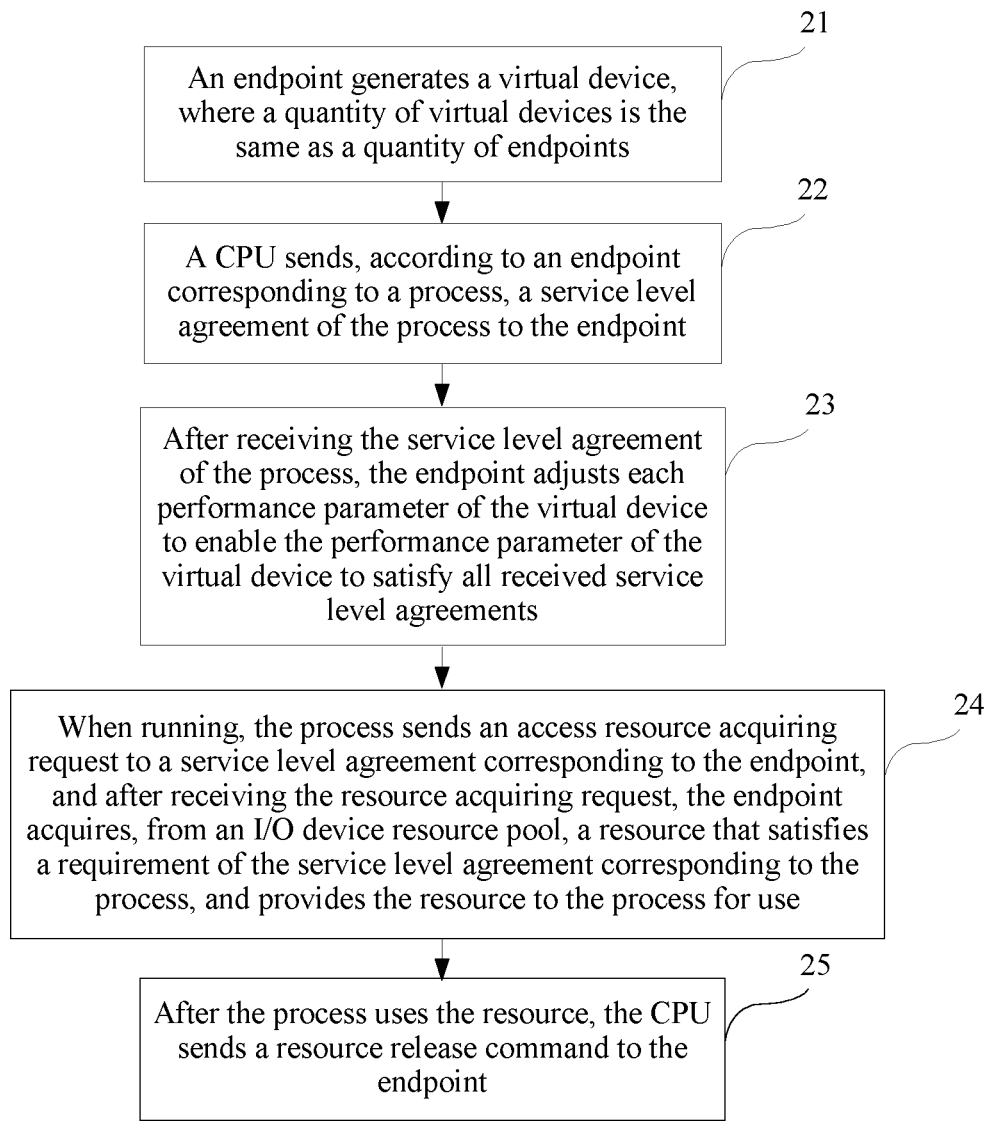
FIG. 3 is a flowchart of a resource management method according to an embodiment.

For a better description of an embodiment of a resource management method, refer to FIG. 3. A CPU may run multiple processes, and the following describes how to perform resource management by using a running process of one of the processes as an example. For convenience of description, this process is referred to as a target process.

Step 21. An endpoint generates a virtual device (Virtual Device, vDev). Each endpoint may generate its own virtual device; or one endpoint may generate multiple virtual devices, and allocate the multiple virtual devices to each endpoint. A quantity of vDevs is the same as a quantity of endpoints, and each endpoint runs one virtual device.

The virtual device is a virtual I/O device. When the endpoint is connected to one I/O device, the CPU may access the I/O device. If the endpoint is connected to multiple I/O devices, it is difficult for the CPU to directly access these I/O devices. Therefore, the virtual I/O device is used to change a quantity of I/O devices into one. That is, by means of I/O device virtualization, for the CPU, it seems that the endpoint is always connected to only one I/O device.

In this embodiment, a resource of the virtual device vDev comes from a resource pool, and if resources of the resource pool come from multiple endpoints, the resource of the vDev may not be limited by the endpoint. That is, a resource of a vDev corresponding to an endpoint may come from an I/O device of the endpoint, may come from an I/O device of another endpoint in a host, or may come from an I/O device of an endpoint in another host.

The vDev may be presented to the CPU in a form of physical function (Physical Function, PF), multifunction (Multi Function, MF), or virtual function (Virtual Function, VF). That is, the vDev may be a virtualized PF, MF or VF.

When multiple endpoints share one resource pool, resources in the resource pool may be equally allocated to all vDevs according to a quantity of endpoints. For example, there are totally three endpoints and six memories, a storage space of each memory is 100 GB, and then a storage space of 200 GB is allocated to each vDev. Resources allocated to different vDevs may be different. For example, a storage space of 100 GB is allocated to a first vDev, a storage space of 200 GB is allocated to a second vDev, and a storage space of 300 GB is allocated to a third vDev. For some types of I/O resources, for example, for an I/O resource provided by an accelerator card, in this step, a vDev may be only generated but no resource is allocated to the vDev. Resources provided by all I/O devices become a part of the resource pool, and can be managed by the endpoint. The resource provided by the I/O device is referred to as an I/O resource.

It should be noted that, in this step, one vDev is created for each endpoint, so that the vDev can be invoked subsequently. An allocation of a resource to each vDev may be a thin allocation, that is, although resources are allocated, a resource allocated to the vDev is not actually occupied by the vDev, and when a process uses the resource, a corresponding resource is actually occupied according to a requirement of the process. The thin allocation may improve resource utilization. Certainly, in another embodiment, the thin allocation may be not used, and the vDev actually occupies the resource. Regardless of an allocation mode, a quantity of resources for a vDev may be adjusted, for example, a resource that is allocated to and possessed by one vDev may be diverted to another vDev for use.

In this embodiment, if resources of I/O devices of multiple endpoints form an I/O resource pool together, a resource in the resource pool may be invoked by any endpoint in the endpoints, and therefore, resource utilization can be improved. Even if in a resource management system constituted by multiple hosts, one endpoint may invoke an I/O device of another endpoint because I/O resources of the hosts form a resource pool together. The invoking endpoint and the invoked endpoint may be on a same host or on different hosts.

A specific invoking method is as follows: A target process sends a resource use request to an endpoint at which a vDev is located, the endpoint at which the vDev is located (a target endpoint) invokes a resource of an I/O device of the endpoint for use by the target process; the target endpoint may also send a resource invoking request to another endpoint by using a switch between endpoints, and after receiving the request, the another endpoint allocates a requested resource to the target process for use.

In this step, each endpoint has one vDev, and a quantity of endpoints may be 1 or at least 2. When the quantity of endpoints is 1, this unique endpoint has one vDev. When the quantity of endpoints of a host is at least 2, each endpoint has one vDev. When the quantity of endpoints is at least 2, resources of all vDevs may be determined together by means of mutual negotiation between the endpoints, and the vDevs are generated according to the determined resources; or all vDevs may be generated by one endpoint, a specific quantity of resources are allocated to each vDev, and then the generated vDevs are allocated to the endpoints.

After the vDev is generated, the CPU may further establish a correspondence between the process and the vDev. Because the vDev runs on the endpoint, a correspondence exists between the vDev and the endpoint at which the vDev is located. That is, a correspondence also exists between the process and the endpoint. In this way, the process may obtain the I/O resource from a corresponding endpoint. The correspondence that is between the process and the vDev and that is established by the CPU represents that the process has a permission to invoke a resource from the endpoint at which the vDev is located.

Step 22. A CPU sends an SLA of a target process to a target endpoint according to a correspondence between a process and an endpoint. The process runs in the CPU, and the CPU may obtain the SLA of the process. In addition, an identifier of the process may further be sent to the endpoint. The identifier of the process may be a process address space identifier (Process Address Space Identifier, PAS ID), where PAS IDs of different processes are different; or may be an ID of another type that can identify a process.

That the CPU sends each performance specification to the endpoint by using the SLA is only an optional manner in which the endpoint obtains the performance specification. Another optional manner is that the endpoint obtains a performance specification from a configuration file recorded in advance, where the configuration file may be stored on a network server or in a local hard disk. The SLA may be further recorded in a database, where the database may also be stored on a network server or in a local hard disk, or be stored in a distributed storage system.

For example, a process is a process of writing data, and performance specifications carried in an SLA of the process include three items: IOPS (Input/Output Per Second, input/output per second)≥500, a latency time (Latency Time)≤1 ms, and bandwidth≥500 Mbps. A storage device is connected to the endpoint, and provides, by using the endpoint, I/O resources that satisfy all the performance specifications to the writing process for use. A resource that satisfies a performance specification of the target process refers to a resource whose performance specification is greater than or equal to the performance specification of the target process.

A possible case is that the process runs in a virtual machine, and the virtual machine runs in the CPU. Another possible case is that there is no virtual machine, and the process directly runs in the CPU. In the past, a process is also referred to as an operation or a job (job). The process is constituted by one or more threads (Thread). It should be noted that in a virtual machine scenario, the process mentioned in the embodiments may be an internal process of the foregoing virtual machine, or may refer to the virtual machine itself, because for an operating system, the virtual machine is also a process. Therefore, the process in this embodiment includes at least three possibilities: a process that directly runs in the CPU, a virtual machine that runs in the CPU, and a process that runs in a virtual machine.

Step 23. After receiving the SLA of the target process, the target endpoint adjusts all performance parameters (e.g., bandwidth of 100 MB, storage space of 100 GB) of the vDev, so that the adjusted performance parameters of the vDev satisfy all received valid SLAs. In addition, the target endpoint stores the received SLA, and when more than one SLA of the process is received, in addition to storing the SLA, further combines each performance specification to generate a combined performance specification, and stores the combined performance specification.

The adjusted performance parameters of the vDev satisfy all the received valid SLAs. The valid SLAs include a currently received SLA and a previously received SLA, but do not include an SLA of a process whose resource has been released. That is, a total request of all processes for resources received by this endpoint may be satisfied by invoking the resources of the vDev. All the processes described herein are processes that still have a permission to invoke resources from the target endpoint, do not include a terminated process, and do not include the process whose resource has been released.

If one endpoint is corresponding to multiple processes, the endpoint may receive SLAs of the multiple processes in a same period of time or in different periods of time, and the endpoint needs to satisfy all the received SLAs. A specific operation method is as follows: combining performance specifications, and adjusting performance parameters of the vDev to satisfy a combined performance specification. A combination policy is as follows: for a type of performance that can be shared by the multiple processes, for each type of performance, a performance specification with a maximum performance requirement is used as the combined performance specification. For a type of performance that cannot be shared by the multiple processes (that is, cannot be occupied by another process after being occupied by a process), for each type of performance, a sum of performance parameters is used as the combined performance specification. For example, IOPS or bandwidth cannot be shared by the multiple processes, and a part of the IOPS occupied by a process or bandwidth occupied by a process cannot be used by another process. However, the performance latency time can be shared by the multiple processes, and a process does not occupy latency time performance of another process. Therefore, as long as a process that has a maximum requirement for a latency time is satisfied, latency time performance of the remaining processes is satisfied. If a process has a performance parameter that another process does not have, a performance specification of this unique performance parameter is used as the combined performance specification. A performance specification is a requirement of a process for a type of performance of a resource, and is a standard for a value of a type of performance parameter.

For example, there are totally three processes, and PAS IDs of the three processes are respectively a process 1, a process 2, and a process 3. The three processes each have two or three performance specifications: the process 1: IOPS≥500, and a latency time≤2 ms; the process 2: IOPS≥400, and a latency time≤1 ms; and the process 3: IOPS≥300, a latency time≤3 ms, and bandwidth≥500 Mbps. In this case, combined performance specifications have totally three items: IOPS≥500+400+300, a latency time≤1 ms, and bandwidth≥500 Mbps. The performance specification is a requirement for a type of performance. The performance parameter includes a parameter value and is used to describe a type of performance of a resource.

In step 21, the resource is allocated to the vDev, but performance of the resource is not involved. In this step, the vDev is enabled to satisfy a QoS requirement. Specifically, resources that the vDev can provide are enabled to satisfy the performance specifications described in the SLA.

The endpoint stores the received SLA, and identifies a PAS ID corresponding to each SLA. The foregoing three processes are used as an example. A performance specification of each process in the endpoint and a combined performance specification include the following content.

Performance specifications of the process 1: IOPS≥500, and a latency time≤2 ms;

Performance specifications of the process 2: IOPS≥400, and a latency time≤1 ms;

Performance specifications of the process 3: IOPS≥300, a latency time≤3 ms, and bandwidth≥500 Mbps; and Total combined performance specifications: IOPS≥1200, a latency time≤1 ms, and bandwidth≥500 Mbps.

Step 24. When running, the target process sends a resource access request to a target endpoint at which the vDev is located, the target endpoint receives the resource access request, and after receiving the resource access request, the target endpoint obtains a PAS ID of the target process from the resource access request. Then the target endpoint uses the PAS ID of the process to search for an SLA of the target process, obtains, from an I/O device resource pool, a resource that satisfies an SLA requirement corresponding to the target process, and provides the resource to the target process for use.

For example, the PAS ID of the target process is the process 1. A current operation of the target process is storing data, and then a required resource is a storage space. The resource access request carries to-be-stored data, and after receiving a resource access request of the process 1, the endpoint searches for an SLA of the process 1, then obtains a storage space that satisfies the SLA requirement, and stores the to-be-stored data into the obtained storage space. It should be noted that sending a resource access request to a vDev of an endpoint corresponding to the process may also be understood as: sending the resource access request to the endpoint to request the vDev of the endpoint to provide a resource.

The target process sends the resource access request. Specifically, the CPU sends the resource access request to the target endpoint, and the access request carries the PAS ID of the process, and may further carry an ID of the vDev.

In this embodiment, an endpoint that receives the resource access request the first time is the target endpoint. The target endpoint may invoke a resource of an I/O device of the target endpoint for use by the target process. The target endpoint may further invoke an I/O device of another endpoint by using a switch between endpoints, which logically cancels a characteristic that an I/O device singly belongs to one endpoint. Specifically, resource utilization is improved by using a resource pool.

An optional manner is that a resource is directly obtained from the resource pool without considering an endpoint to which the I/O device belongs, and the resource may come from any I/O device. Another optional manner is that the endpoint preferentially invokes a resource provided by an I/O device of the endpoint, and when the resource of the I/O device of the endpoint is insufficient to satisfy a requirement, a remaining resource that is required is obtained from an I/O device of another endpoint. Compared with the former manner, in the latter manner, workload of the switch may be reduced, and a speed of invoking resource is improved. A homing relationship exists between the I/O device and the endpoint, and an I/O device possessed by an endpoint is an I/O device endpoint device that is directly connected to the endpoint.

It should be noted that, in this step, that the target process invokes the resource is used as an example. Actually, another process may also invoke the resource by using the target endpoint. The adjusted virtual device satisfies all the received valid SLAs. Therefore, in addition to the target process, if another process also has a permission to invoke the resource from the target endpoint, when running, the another process sends a resource access request to the target endpoint at which the vDev is located, the target endpoint may also obtain, from the I/O device resource pool, a resource that satisfies an SLA requirement corresponding to the another process, and provide the resource to the another process for use. After this embodiment is used, the endpoint can satisfy demands for resource of all processes that use the endpoint.

Step 25. After the target process uses the resource, the CPU sends a resource release command to the target endpoint, so as to release the resource occupied by the target process.

In addition, after the target process ends, the target endpoint may update the stored performance specification, cancel, from the endpoint, the performance specification of the process that ends, and update a combined performance specification according to a process that does not end.

When the vDev is created, I/O devices of different types may be different. In the foregoing embodiments, because a physical I/O device provided to the endpoint for use is a memory, a resource provided by the memory is a storage capacity; the vDev is virtualization of the physical I/O device, the vDev may also be referred to as a virtual memory. If the I/O device is a network adapter, the vDev is a virtual network adapter, a resource provided by the network adapter is network bandwidth, and a performance parameter is, for example, a latency time. If the I/O device is an encryption accelerator card, the vDev is a virtual encryption accelerator card. A resource of the accelerator card is encryption algorithm operations per second, but generally, the encryption algorithm operations per second may also be regarded as a performance parameter of QoS, and therefore the resource is not allocated to the vDev when the vDev is created, but the encryption algorithm operations per second is used as a performance parameter of the resource. Therefore, the resource may be not allocated when the vDev is created (step 21), but the resource is used as a type of the performance parameter. For example, in addition to carrying an IOPS requirement, a latency time requirement, and a bandwidth requirement, the SLA further carries a storage space requirement, for example, a storage space≥200 GB.

In addition, if the performance specification of the process changes, the CPU may send a new performance specification to a corresponding endpoint. The endpoint updates the stored performance specification according to the new performance specification, and updates the combined performance specification. When the process is running, a resource is obtained according to the new performance specification.

A computer or a device having a main function of a computer may also be generally referred to as a node. In this embodiment, based on a cross-node scenario in FIG. 2, crossover I/O resource sharing may be implemented by means of interconnection between endpoints. When an I/O resource of a process of a node is insufficient, an I/O resource may be obtained from another node.

In the foregoing embodiment, in step 22, the performance specification is carried in the SLA, and the SLA is sent to the endpoint by using the CPU. That is, the endpoint obtains the performance specification of the process by using the SLA sent by the CPU. The performance specification may be sent to the endpoint by using the CPU, and may not be carried in the SLA.

In addition to the foregoing two manners, the present embodiment further provides an embodiment of another resource management method. A difference from the foregoing embodiments lies in that a performance specification is not obtained by using a CPU, which is equivalent to that step 22 is modified. For another step, reference may be made to the foregoing embodiments. In this embodiment, another resource management method, the performance specification is pre-stored by an endpoint, and does not need to be obtained from the CPU.

An optional solution is that the endpoint collects statistics about performance of a resource occupied by the process, and sets the performance specification for the process according to a statistical result. It is assumed that after a period of time of collecting statistics, in a process in which a process uses a stored resource, occupied bandwidth ranges between 10 MB and 20 MB. The bandwidth performance specification of the process may be set to be not less than 20 MB. Performance specifications of the remaining performance parameters of the process may also be obtained by collecting statistics. In this solution, the process may run better and resource utilization is improved when the process does not have a mandatory performance requirement (for example, the SLA does not include a performance requirement).

Another optional solution is that a system administrator sets the performance specification for the process according to experience.

In this embodiment, a corresponding resource is allocated, from a resource pool according to the performance specification of the process, to the process to satisfy a QoS requirement of the process. However, for a source of the resource in the resource pool, the present embodiment may further perform extension. A resource pool implementation method is that resources of I/O devices that belong to different endpoints and that are in a host constitute the resource pool. A second implementation method is that multiple hosts are interconnected to constitute a system, resources of I/O devices that belong to different endpoints constitute the resource pool, and not all these endpoints come from a same host. The first implementation method and the second implementation method may be concluded as that resources of I/O devices of multiple endpoints constitute the resource pool, and a difference lies in that these endpoints come from a same host or different hosts. A third implementation method is that a resource of an I/O device of a single endpoint constitutes the resource pool. A fourth implementation method is that resources of I/O devices of multiple endpoints constitute a large resource pool, then the large resource pool is divided into multiple small resource pools, and one or more endpoints share one small resource pool. When the small resource pools are obtained by means of division, a home endpoint of the resources is not considered.

Figure 4:
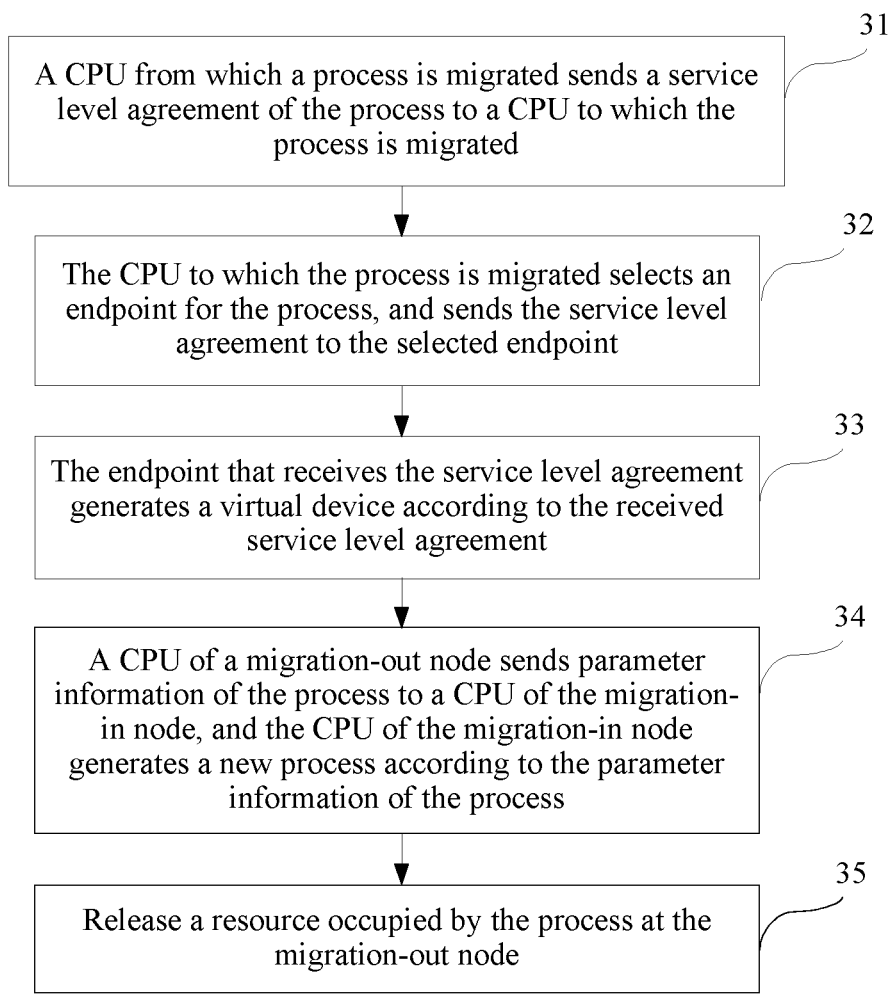
FIG. 4 is a flowchart of a process migration method according to an embodiment.

Based on the foregoing embodiments, the present embodiment further provides an embodiment of process migration. Specifically, according to this embodiment, a process is migrated from a host to another host, and specifically, is migrated from a CPU to another CPU. Refer to FIG. 4. In this method, after the process is migrated from a host to another host, a performance specification of the process remains unchanged. A solution of the process migration includes: when a host runs an original process, generating a new process on another host by using description information of the original process, so that the new process is the same as the original process. After the new process is generated, the original process may be terminated. How to generate the new process by using the description information is not included in this embodiment. A main focus of the embodiment lies in: how to ensure that a resource configuration of the new process is consistent with that of the original process after and before the process is migrated. The following is specific steps of the process migration.

Step 31. A CPU of a migration source host sends an SLA of an original process to a CPU of a migration target host.

The CPU of the migration source host is currently running the original process. The CPU from which the process is migrated sends the SLA to a network adapter of the migration target host by using a network adapter of the migration-out host, and the network adapter of the migration target host sends the SLA of the original process to the CPU to which the process is migrated.

Step 32. The CPU of the migration target host selects an endpoint as a migration-in endpoint, and sends the SLA to the migration-in endpoint.

The CPU may select the migration-in endpoint by using multiple algorithms, for example, a feasible method is randomly designating an endpoint as a migration-in endpoint.

Step 33. After receiving the SLA, the migration-in endpoint generates a vDev according to a performance specification carried in the SLA.

If the endpoint that receives the SLA already has a vDev, an existing vDev is updated. For an update process, refer to step 23. The updated vDev satisfies performance specifications (including performance specifications of a to-be-migrated-in process, and performance specifications carried in valid SLAs received by the migration-in endpoint before the original process is migrated) of all valid SLAs corresponding to the migration-in endpoint. For how to satisfy the performance specifications, refer to the specific operation method of step 23.

If the endpoint that receives the SLA does not have a vDev, a vDev is generated according to the performance specification of the original process.

Step 34. The CPU of the migration source host sends description information of the original process to the CPU of the migration target host. The CPU of the migration target host generates a new process according to the description information of the original process, which implements the process migration.

A sequence of sending the description information and the SLA is not limited. The description information may be first sent, and then the SLA is sent.

After generating the new process, the CPU of the migration target host sends a response message to the migration-out host, and the original process that runs in the CPU of the migration source host may be terminated. Alternatively, after the migration source host sends the description information, the original process is terminated and does not need to wait for a response message from the migration target host.

The description information of the process is information that is enough to enable the new process to be the same as the original process. The description information includes context information of the process, such as corresponding memory data when the process runs and a value of the process in a register when the process runs in the CPU. A possible method is that memory pages of the process are transmitted from the migration source host to the migration target host page by page. In this process, it is possible that the running process modifies a transmitted memory page, and in this case, to enable a memory page transmitted to a node to remain in a latest state, the CPU of the migration source host attempts to retransmit this modified memory page. When transmission of the memory pages of the process is completed, the CPU of the migration source host suspends execution of the process, and at the same time, stores a value of the process in a register when the process runs in the CPU at a pause moment and transmits the value to the CPU of the migration target host. The CPU of the migration target host starts to execute the process after restoring the value of the process in the register when the process runs in the CPU.

Step 35. A new process sends a resource access request to a corresponding endpoint, and the endpoint that receives the resource request obtains a resource according to the SLA of the process to provide the resource to the process for use.

In addition, after step 34, there may further be step 36: The CPU of the migration target host sends a resource release instruction to the endpoint of the migration-out host, and after receiving the resource release instruction, the migration source host releases the resource occupied when the original process runs. This step is optional. Another feasible method is as follows: After sending the description information and the SLA, the migration-out host directly releases the resource occupied by the original process without waiting for the resource release instruction.

In the foregoing migration methods, after a resource is allocated to a process, if the process is migrated, the migrated process may easily have a resource with same performance again.

Figure 5:
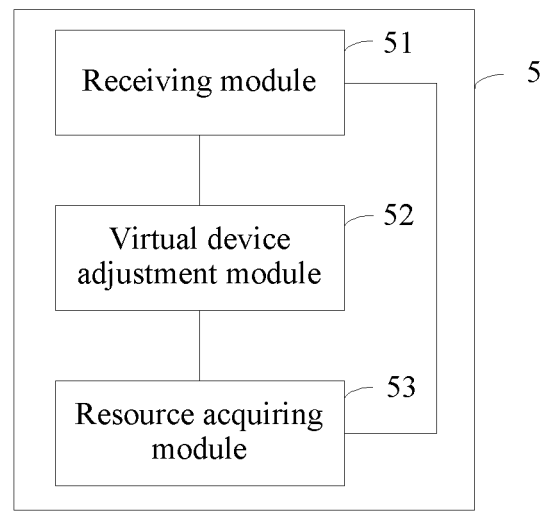
FIG. 5 is a structural diagram of a resource management device according to an embodiment.

Referring to FIG. 5, the present embodiment further provides an embodiment of a resource management apparatus, and the foregoing methods may be used to correspond 52. For specific details, reference may be made to the foregoing method embodiments, and therefore only a brief description is provided below. A resource management apparatus 5 includes a receiving module 51, a virtual device adjustment module 52 connected to the receiving module 51, and a resource acquiring module 53 connected to the virtual device adjustment module. The resource management apparatus 5 may run a virtual device. The resource management apparatus may be hardware, or may be software or firmware that runs in hardware.

The receiving module 51 is configured to receive a performance specification of a target process and a resource access request, where the receiving a performance specification of a target process is specifically: receiving, by the receiving module, the performance specification from the CPU; or collecting, by the resource management apparatus, statistics about performance of a resource occupied when the target process runs in history, and generating the performance specification according to a statistical result.

The virtual device adjustment module 52 is configured to adjust a performance parameter of the virtual device according to the performance specification, where the adjusted virtual device satisfies a total requirement of performance specifications of all processes that use the resource management device.

The resource acquiring module 53 is configured to: after the receiving module receives the resource access request, of the target process, for the virtual device, obtain, from an I/O device, a resource that satisfies the performance specification of the target process, and provide the resource to the target process. The resource provided by the I/O device may be provided by a single I/O device, or may be provided by multiple I/O devices in a resource pool manner.

For example, resources of multiple I/O devices form an I/O resource pool together, an I/O device managed by the resource management apparatus 5 and an I/O device managed by another resource management apparatus form the I/O resource pool together, and the obtaining, from an I/O device, a resource that satisfies the performance specification of the target process specifically includes: obtaining, by the resource acquiring module and from the I/O resource pool, the resource that satisfies the performance specification of the target process.

The resource pool may also be the I/O resource pool formed together by resources of multiple I/O devices managed by the resource management apparatus, and the obtaining, from an I/O device, a resource that satisfies the performance specification of the target process specifically includes: obtaining, by the resource acquiring module and from the I/O resource pool, the resource that satisfies the performance specification of the target process.

Figure 6:
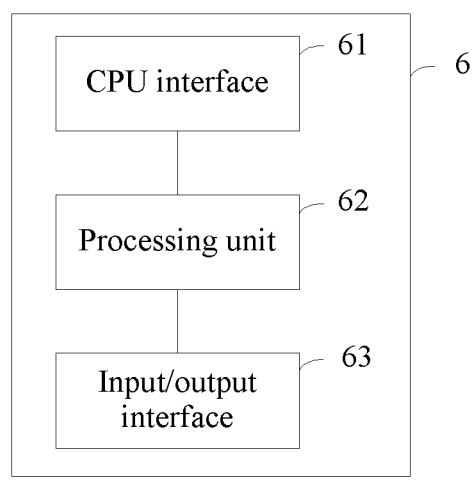
FIG. 6 is a structural diagram of an endpoint according to an embodiment.

In the method embodiments in FIG. 1 and FIG. 2, the endpoint is mentioned, but an end-to-end internal structure is not described. Referring to FIG. 6, the following briefly describes the structure of the endpoint. Because a specific function of the endpoint is described in detail in the method embodiments, details are not described in this embodiment. An endpoint 6 is connected to a CPU by using a CPU interface 61, where the endpoint includes: the CPU interface 61, configured to be connected to the CPU; an input/output I/O interface 63, configured to be connected to an I/O device; and a processing unit 62, connected to the CPU interface and the I/O interface. The endpoint 6 may be independent from a host, or may constitute a host together with the CPU.

The processing unit 62 in which a virtual device is disposed is further configured to: obtain a performance specification of a target process, and adjust a performance parameter of the virtual device according to the performance specification, where the adjusted virtual device satisfies a total requirement of performance specifications of all processes that use the endpoint; and receive a resource access request, of the target process, for the virtual device by using the CPU interface; obtain, from the I/O device, a resource that satisfies the performance specification of the target process, and send the obtained resource by using the CPU interface.

Based on the foregoing descriptions of the embodiments, persons skilled in the art may clearly understand that the present invention may be implemented by software in addition to necessary universal hardware or by hardware only. The computer software product can be stored in a readable storage medium, such as a floppy disk, a hard disk or an optical disc of a computer, and includes several instructions for instructing a computer device (which may be a personal computer, a server, a network device, or the like) to perform the methods described in the embodiments.

The foregoing descriptions are merely exemplary embodiments and are not intended to limit the protection scope of any conceivable embodiment. Any variation or replacement readily figured out by persons skilled in the art within the technical scope disclosed in the present disclosure shall fall within the protection scope of the invention.

What is claimed is:

1. A resource management method, comprising:
    associating, by a target endpoint, a target process to a virtual device in a set of one or more virtual devices disposed on the target endpoint, wherein the target process is allocated to the target endpoint by a first processor that is disposed in a first host, the target endpoint coupling the first processor and an Input/Output (I/O) resource pool;
    obtaining, by the target endpoint, a performance specification of the target process;
    adjusting, by the target endpoint, a performance parameter of the virtual device to obtain an adjusted virtual device, wherein the performance parameter is adjusted according to the performance specification of the target process and a performance specification of other processes which use the set of one or more virtual devices disposed on the target endpoint, wherein the adjusted virtual device satisfies a total requirement of performance specifications of all processes that use the set of one or more virtual devices disposed on the target endpoint, and wherein the total requirement is a summation of requirements for performance specifications of all processes that use the set of one or more virtual devices disposed on the target endpoint;
    receiving, by the target endpoint from the first processor, a resource access request of the target process;
    obtaining, by the target endpoint based on the resource access request, access to a resource from the I/O resource pool that meets the performance specification of the target process; and
    providing, by the target endpoint, access to the resource obtained from the I/O resource pool to the target process;
    wherein the method further comprises migrating a first process to a second host, the second host comprising a second processor, a second endpoint, and a second I/O resource pool, the migrating comprising:
        sending, by the first processor, a first performance specification of the first process to the second processor;
        sending, by the second processor, the first performance specification to the second endpoint;
        generating, by the second endpoint, a second virtual device, wherein the second virtual device satisfies the first performance specification;
        sending, by the first processor, description information of the first process to the second processor, and generating, by the second processor, a second process that satisfies the first performance specification according to the description information;
        sending, by the second processor, a second resource access request of the second process for the second virtual device to the second endpoint when the second process needs to access a resource;
        after receiving the second resource access request, obtaining, by the second endpoint, a second resource from the second I/O resource pool according to the first performance specification;
        providing, by the second endpoint, access to the second resource obtained from the I/O resource pool to the second process.

2. The resource management method according to claim 1, wherein the obtaining, by the target endpoint, the performance specification of the target process comprises:
    obtaining, by the target endpoint, the performance specification from the first processor.

3. The resource management method according to claim 1, wherein the obtaining, by the target endpoint, the performance specification of the target process comprises:

collecting, by the target endpoint, statistics about performance of a resource occupied by the target process in a period of time; and generating, by the target endpoint, the performance specification of the target process according to the statistics.

4. The resource management method according to claim 1,
wherein the I/O resource pool comprises resources of multiple I/O devices from multiple endpoints, or
wherein the I/O resource pool comprises resources of multiple I/O devices from a common endpoint.

5. The resource management method according to claim 1, wherein:
the performance specification of the target process comprises a latency time; or
the performance specification of the target process comprises input/output per second (IOPS) and bandwidth.

6. A host comprising:
a processor;
a target endpoint coupling the processor and an Input/Output (I/O) resource pool, wherein the I/O resource pool is external to the host; and
a memory storage comprising instructions in communication with the CPU,
wherein the CPU executes the instructions to:
allocate the target endpoint to a target process; and
send, to the target endpoint, a resource access request of a virtual device disposed on the target endpoint;
wherein the target endpoint is configured to perform operations to:
receive the resource access request from the target process;
obtain a performance specification of the target process;
adjust a performance parameter of the virtual device to obtain an adjusted virtual device, wherein the performance parameter is adjusted according to the performance specification of the target process and a performance specification of other processes which use the target endpoint, wherein the adjusted virtual device satisfies a total requirement of performance specifications of all processes that use the target endpoint, and wherein the total requirement is a summation of requirements for performance specifications of all processes that use the target endpoint;
based on the resource access request, obtain access to an I/O resource from the I/O resource pool according to the performance specification of the target process;

provide access to the I/O resource to the target process; and
migrate a first process to a second host, wherein the host and the second host comprise a resource management system, and the second host comprises a second processor, a second endpoint, and a second I/O resource pool,
wherein:
the processor is configured to send a first performance specification of the first process to the second processor, and to send description information of the first process to the second processor;
the second processor is configured to send the first performance specification to the second endpoint, and to generate a second process according to the description information;
the second endpoint is configured to generate second virtual device, the second virtual device satisfying the first performance specification; and
the second processor is configured to send a second resource access request of the second process for the second virtual device to the second endpoint when the second process needs to access a second resource, and after receiving the second resource access request, the second endpoint obtains the second resource from the second I/O resource pool according to the first performance specification and provides the second resource to the second process for use.

7. The host according to claim 6, wherein the target endpoint further performs operations to obtain the performance specification of the target process from the processor.

8. The host according to claim 6, wherein the target endpoint further performs operations to:
collect statistics about performance of a resource occupied by the target process in a period of time, and
generate the performance specification for the target endpoint of the target process according to the statistics.

9. The host according to claim 6, wherein an I/O device couples at least two endpoints, the at least two endpoints forming the I/O resource pool.

10. The host according to claim 6,
wherein the I/O resource pool comprises resources of multiple I/O devices from multiple endpoints, or
wherein the I/O resource pool comprises resources of multiple I/O devices from a common endpoint.

* * * * *

UNITED STATES PATENT AND TRADEMARK OFFICE
CERTIFICATE OF CORRECTION

PATENT NO. : 11,379,265 B2
APPLICATION NO. : 16/434403
DATED : July 5, 2022
INVENTOR(S) : Yu et al.

Page 1 of 1

It is certified that error appears in the above-identified patent and that said Letters Patent is hereby corrected as shown below:

On the Title Page

Page 2: U.S. Patent Documents, Column 1, Line 6: "8,139,598 B2 3/2012 Holmstroem et al." should read -- 8,139,598 B2 3/2012 Holmström et al. --.

Page 2: Foreign Patent Documents, Column 2, Line 11: "RU 2417417 C2 5/2008" should read -- RU 2417417 C2 4/2011 --.

Page 2: Other Publications, Column 2, Line 20: "USENIX conference on file and storage technologies, Apr. 2, 2003," should read -- USENIX conference on file and storage technologies, FAST, Vol. 3, Apr. 2, 2003, --.

Signed and Sealed this
Sixth Day of December, 2022

Katherine Kelly Vidal
*Director of the United States Patent and Trademark Office*